(12) United States Patent
Takeuchi et al.

(10) Patent No.: US 9,527,230 B2
(45) Date of Patent: Dec. 27, 2016

(54) METHOD FOR MANUFACTURING JOINT MEMBER AND JOINT MEMBER

(71) Applicant: Teijin Limited, Osaka-shi, Osaka (JP)

(72) Inventors: Masaki Takeuchi, Matsuyama (JP); Masumi Hirata, Matsuyama (JP); Takumi Kato, Matsuyama (JP); Hiroki Sano, Matsuyama (JP)

(73) Assignee: Teijin Limited, Osaka-Shi, Osaka (JP)

( * ) Notice: Subject to any disclaimer, the term of this patent is extended or adjusted under 35 U.S.C. 154(b) by 169 days.

(21) Appl. No.: 14/389,166

(22) PCT Filed: Mar. 27, 2013

(86) PCT No.: PCT/JP2013/059039
§ 371 (c)(1),
(2) Date: Sep. 29, 2014

(87) PCT Pub. No.: WO2013/146900
PCT Pub. Date: Oct. 3, 2013

(65) Prior Publication Data
US 2015/0064409 A1 Mar. 5, 2015

(30) Foreign Application Priority Data
Mar. 29, 2012 (JP) .................. 2012-076865

(51) Int. Cl.
*B29C 45/14* (2006.01)
*B32B 15/08* (2006.01)
(Continued)

(52) U.S. Cl.
CPC ..... *B29C 45/14311* (2013.01); *B29C 45/0005* (2013.01); *B29C 65/02* (2013.01);
(Continued)

(58) Field of Classification Search
CPC ..................................................... B28B 21/74
(Continued)

(56) References Cited

U.S. PATENT DOCUMENTS

2011/0159302 A1  6/2011  Hirai et al.
2013/0272780 A1  10/2013  Takeuchi et al.

FOREIGN PATENT DOCUMENTS

EP  0495655 A1  7/1992
EP  1717345 A1  11/2006
(Continued)

OTHER PUBLICATIONS

Feb. 24, 2015—(EP) Supplementary Search Report—App 13770274.
(Continued)

*Primary Examiner* — Brent O'Hern
(74) *Attorney, Agent, or Firm* — Banner & Witcoff, Ltd.

(57) ABSTRACT

There is provided a method for manufacturing a joint member obtained by joining a carbon fiber composite material containing a thermoplastic resin as a matrix and a metal. The method includes a step (i) of forming an uneven shape having a depth of 0.02 to 0.6 mm on a surface of the metal at a joining portion; a step (ii) of providing a thermoplastic resin layer having a thickness in the range of 5μm or more and 5 mm or less at a joining portion between the surface of the metal and a surface of the composite material; and a step (iii) of melting the thermoplastic resin layer by heating the joining portion to thereby combine the metal and the composite material into one.

17 Claims, 3 Drawing Sheets

(51) Int. Cl.

| | |
|---|---|
| *B29C 65/48* | (2006.01) |
| *B29C 65/00* | (2006.01) |
| *B29C 65/46* | (2006.01) |
| *B29C 70/86* | (2006.01) |
| *B29C 65/02* | (2006.01) |
| *B29C 45/00* | (2006.01) |
| *B32B 5/02* | (2006.01) |
| *B32B 15/14* | (2006.01) |
| *B32B 1/00* | (2006.01) |
| B29C 65/50 | (2006.01) |
| B29C 65/44 | (2006.01) |
| B29C 37/00 | (2006.01) |
| B29K 705/00 | (2006.01) |
| B29K 101/12 | (2006.01) |
| B29K 105/08 | (2006.01) |
| B29K 307/04 | (2006.01) |
| B29L 9/00 | (2006.01) |
| B29C 65/14 | (2006.01) |
| B29C 65/82 | (2006.01) |

(52) U.S. Cl.
CPC .......... *B29C 65/46* (2013.01); *B29C 65/4815* (2013.01); *B29C 65/5057* (2013.01); *B29C 66/02* (2013.01); *B29C 66/1122* (2013.01); *B29C 66/3032* (2013.01); *B29C 66/524* (2013.01); *B29C 66/5326* (2013.01); *B29C 66/7212* (2013.01); *B29C 66/7392* (2013.01); *B29C 66/742* (2013.01); *B29C 70/86* (2013.01); *B32B 1/00* (2013.01); *B32B 5/022* (2013.01); *B32B 15/08* (2013.01); *B32B 15/14* (2013.01); B29C 37/0078 (2013.01); B29C 65/14 (2013.01); B29C 65/44 (2013.01); B29C 65/5028 (2013.01); B29C 65/8215 (2013.01); B29C 66/022 (2013.01); B29C 66/026 (2013.01); B29C 66/0246 (2013.01); B29C 66/02245 (2013.01); B29C 66/71 (2013.01); B29C 66/72141 (2013.01); B29C 66/72143 (2013.01); B29C 66/7422 (2013.01); B29C 66/7428 (2013.01); B29C 66/74281 (2013.01); B29C 66/74283 (2013.01); B29C 66/91933 (2013.01); B29C 66/929 (2013.01); B29C 66/949 (2013.01); B29C 2045/14319 (2013.01); B29K 2101/12 (2013.01); B29K 2105/08 (2013.01); B29K 2307/04 (2013.01); B29K 2705/00 (2013.01); B29L 2009/003 (2013.01); B32B 2250/02 (2013.01); B32B 2255/06 (2013.01); B32B 2255/24 (2013.01); B32B 2255/26 (2013.01); B32B 2255/28 (2013.01); B32B 2260/021 (2013.01); B32B 2260/046 (2013.01); B32B 2262/106 (2013.01); B32B 2307/54 (2013.01); B32B 2307/718 (2013.01); Y10T 428/24545 (2015.01)

(58) Field of Classification Search
USPC .......................................................... 264/265
See application file for complete search history.

(56) References Cited

FOREIGN PATENT DOCUMENTS

| | | | |
|---|---|---|---|
| EP | 2322691 A1 | 5/2011 | |
| JP | S63-267531 A | 11/1988 | |
| JP | H02-298284 A | 12/1990 | |
| JP | H05-051671 A | 8/1993 | |
| JP | H10-294024 A | 11/1998 | |
| JP | 2003-103563 A | 4/2003 | |
| JP | 2006-297927 A | 11/2006 | |
| JP | 2007-007894 A | 1/2007 | |
| JP | 2010-260174 A | 11/2010 | |
| JP | 2011-235570 A | 11/2011 | |
| SE | WO 0013892 A1 * | 3/2000 | .......... B29C 70/088 |
| WO | 2007/072603 A1 | 6/2007 | |
| WO | 2009/157445 A1 | 12/2009 | |
| WO | 2012/074083 A1 | 6/2012 | |

OTHER PUBLICATIONS

Apr. 23, 2013—(JP) Written Opinion—App PCT/JP2013/059039—Eng Tran.
Apr. 23, 2013—International Search Report—Intl App PCT/JP2013/059039.
Mar. 11, 2015—(EP) Office Action—App 13770274.2.

* cited by examiner

METHOD FOR MANUFACTURING JOINT MEMBER AND JOINT MEMBER

CROSS REFERENCE TO RELATED APPLICATIONS

This is a U.S. National Phase Application under 35 U.S.C. §371 of International Application No. PCT/JP2013/059039, filed Mar. 27, 2013, which claims priority to Japanese Patent Application No. 2012-076865, filed Mar. 29, 2012, the entire disclosures of which are incorporated herein by reference.

TECHNICAL FIELD

The present invention relates to a joint member of a thermoplastic carbon fiber composite material and a metal, and a joint member obtained by the method.

BACKGROUND ART

A carbon fiber composite material has high specific strength and specific rigidity and is light in weight, so that it is valued as an extremely excellent material in various fields. Hitherto, in joining a thermosetting carbon fiber composite material using a thermosetting resin as a matrix to a different kind of a material, particularly a metal, there have been employed joining using a bolt and a nut, a rivet or the like that is mechanical joining or joining using an adhesive. The mechanical joining with a bolt, a nut or the like generally involves an increase in weight and also particularly, there is a concern that in a composite material, stress is concentrated in a joining point, and in the worst case, fracture continuously proceeds starting from the first stress concentrated point. In the joining using an adhesive, it is generally necessary to secure an adhesive layer having a certain thickness in order to secure strength. Particularly, in the case of joining a large-sized member, a considerably amount of the adhesive is required. As a result, there is a concern for a great increase in weight of the resulting member. Furthermore, there is a problem that joining strength thereof is not always sufficient with only the adhesive. Additionally, in the joining with the adhesive, since much time is generally required until practical joining strength is attained from joining, an aging step must be taken into consideration after the joining.

On the other hand, in a carbon fiber composite material using a thermoplastic resin as a matrix (hereinafter sometimes referred to as a "thermoplastic carbon fiber composite material" or simply a "composite material"), materials are joined to each other by welding in a range that the thermoplastic resin is compatible, and joining strength comparable to a joined body of the matrix resin itself can be expected. However, there are many cases that the joining of the matrix resin to a metal by welding (fusing) is difficult even in the case of the thermoplastic carbon fiber composite material.

To weld the thermoplastic carbon fiber composite material to a metal, it is required that the thermoplastic resin itself used as a matrix can weld to the metal. Patent Document 1 describes that a metal and a resin are joined by welding. Specifically, there is described that the both can be joined due to an anchor effect by injection-molding a resin to an aluminum material whose surface is made finely porous. Moreover, Patent Documents 2 to 6 describe that a resin and a metal are joined by applying a certain treatment to a metal surface.

Furthermore, with regard to a thermosetting carbon fiber composite material containing a thermosetting resin as a matrix, Patent Document 7 describes a joining method with arranging an intermediate resin layer having an affinity with both a metal and the composite material.

CITATION LIST

Patent Documents

Patent Document 1: JP-A-2003-103563
Patent Document 2: JP-B-5-51671
Patent Document 3: WO2009/157445
Patent Document 4: WO2007/072603
Patent Document 5: JP-A-2011-235570
Patent Document 6: WO2012/074083
Patent Document 7: JP-A-2006-297927

SUMMARY OF INVENTION

Problems that Invention is to Solve

An advantage of a thermoplastic carbon fiber composite material containing a thermoplastic resin as a matrix is that its shape easily changes when heat is applied. Therefore, injection- or press-molding can be conducted within an extremely short period of time as compared with a thermosetting carbon fiber composite material containing a thermosetting resin as a matrix. Therefore, if the thermoplastic resin as a matrix can be utilized for joining in the thermoplastic carbon fiber composite material, it is considered that the joining of the carbon fiber composite material and a metal can be extremely easily and extremely efficiently achieved by thermocompression bonding in a mold and also the molding of the joint member can be simultaneously performed.

However, even when the thermoplastic carbon fiber composite material is tried to achieve joining by the joining method of a thermoplastic resin and a metal, as described in Patent Documents 2 and 3, in the thermoplastic carbon fiber composite material, the thermoplastic resin as a matrix is in a state of "soaking into" a carbon fiber bundle. Therefore, the resin is not always homogeneously present on the surface of the material, and in some cases, a portion "deficient" in the thermoplastic resin is present, so that there was a concern that sufficient joining strength is not developed and joining strength shows great variations. Furthermore, the carbon fiber causes a so-called electrolytic corrosion to a metal. Therefore, when the carbon fiber comes into contact with a metal in a portion deficient in the matrix resin, the contact causes the corrosion of a metal.

A main object of the present invention is to provide a method for manufacturing a joint member in which a thermoplastic carbon fiber composite material and a metal are strongly joined.

Means for Solving the Problems

As a result of intensive investigations on the method for achieving strong joining between a thermoplastic carbon fiber composite material and a metal, the present inventors have found that the metal and the composite material can be closely adhered and joined strongly and stably by forming an uneven shape having a specific depth on the metal surface portion to which the composite material is to be joined, providing a thermoplastic resin layer between such a metal surface portion and the composite material in a specific thickness, and melting a part of the thermoplastic resin constituting the thermoplastic resin layer and the thermoplastic carbon fiber composite material by heating the joining portion containing the thermoplastic resin layer to thereby closely adhere and join the metal to the composite material, and thus have reached the present invention.

Namely, the present invention relates to a method for manufacturing a joint member obtained by joining a carbon fiber composite material containing a thermoplastic resin as a matrix and a metal, the method including:

a step (i) of forming an uneven shape having a depth of 0.02 to 0.6 mm on a surface of the metal at a joining portion;

a step (ii) of providing a thermoplastic resin layer having a thickness in the range of 5 µm or more and 5 mm or less at a joining portion between the metal and the composite material; and a step (iii) of melting the thermoplastic resin layer by heating the joining portion to thereby strongly join the metal and the composite material.

Advantage of Invention

According to the present invention, a thermoplastic carbon fiber composite material and a metal can be joined strongly and stably by a simple method. Furthermore, by joining the carbon fiber composite material and the metal through a thermoplastic resin, electrolytic corrosion caused by carbon fiber can be simultaneously prevented. Additionally, a joint member of the carbon fiber composite material and the metal can be obtained for a short period of time.

Moreover, the joining and molding can be conducted simultaneously or continuously in the same mold. Therefore, when they are simultaneously or continuously performed, it becomes possible to produce a joined body of the carbon fiber composite material and a metal (metal composite molded body) having a shape molded into a desired one in less number of steps for a short period of time.

EMBODIMENTS FOR CARRYING OUT INVENTION

The present invention relates to a method for manufacturing a joint member obtained by joining a carbon fiber composite material containing a thermoplastic resin as a matrix (thermoplastic carbon fiber composite material) and a metal, the method comprising:

a step (i) of forming an uneven shape having a depth of 0.02 to 0.6 mm on a surface of the metal at a joining portion;

a step (ii) of providing a thermoplastic resin layer having a thickness in the range of 5 µm or more and 5 mm or less at a joining portion between the metal and the carbon fiber composite material; and a step (iii) of melting the thermoplastic resin layer by heating the joining portion to thereby strongly join the metal and the composite material.

[Thermoplastic Carbon Fiber Composite Material]

The thermoplastic carbon fiber composite material used for joining to a metal in the invention is a composite material using a thermoplastic resin as a matrix and containing a carbon fiber as a reinforcing fiber in such a matrix.

Here, the thermoplastic carbon fiber composite material preferably contains the thermoplastic resin in an amount of 50 to 1,000 parts by weight based on 100 parts by weight of the carbon fiber. More preferably, the amount of the thermoplastic resin is from 50 to 400 parts by weight based on 100 parts by weight of the carbon fiber. Still more preferably, the amount of the thermoplastic resin is 50 to 100 parts by weight based on 100 parts by weight of the carbon fiber. When the amount of the thermoplastic resin is 50 parts by weight or more based on 100 parts by weight of the carbon fiber, a dry carbon fiber exposed from the matrix resin is less prone to increase, so that the case is preferred. Also, when the thermoplastic resin is contained in an amount of 1,000 parts by weight or less based on 100 parts by weight of the carbon fiber, the carbon fiber is contained in an appropriate amount and thereby is suitable as a structural material, so that the case is preferred.

Examples of the thermoplastic resin include polyamide, polycarbonate, polyoxymethylene, polyphenylene sulfide, polyphenylene ether, modified polyphenylene ether, polyethylene terephthalate, polybutylene terephthalate, polyethylene naphthalate, polyethylene, polypropylene, polystyrene, polymethyl methacrylate, AS resin, and ABS resin. Particularly, in view of a balance between costs and properties, at least one selected from the group consisting of polyamide, polypropylene, polycarbonate and polyphenylene sulfide is preferred.

Moreover, as the polyamide (sometimes abbreviated as "PA", and sometimes called "nylon" as another name), at least one selected from the group consisting of PA6 (called polycaproamide or polycaprolactam, and more accurately, poly ϵ-caprolactam), PA26 (polyethylene adipamide), PA46 (polytetramethylene adipamide), PA66 (polyhexamethylene adipamide), PA69 (polyhexamethylene azepamide), PA610 (polyhexamethylene sebacamide), PA611 (polyhexamethylene undec amide), PA612 (polyhexamethylene dodecamide), PA11 (polyundecane amide), PA12 (polydodecane amide), PA1212 (polydodecamethylene dodecamide), PA6T (polyhexamethylene terephthalamide), PA6I (polyhexamethylene isophthalamide), PA912 (polynonamethylene dodecamide), PA1012 (polydecamethylene dodecamide), PA9T (polynonamethylene terephthalamide), PA9I (polynonamethylene isophthalamide), PA10T (polydecamethylene terephthalamide), PA10I (polydecamethylene isophthalamide), PA11T (polyundecamethylene terephthalamide), PA11I (polyundecamethylene isophthalamide), PA12T (polydodecamethylene terephtalamide), PA12I (polydodecamethylene isophthalamide), and polyamide MXD6 (polymetaxylene adipamide) is preferred.

These thermoplastic resins may contain additives such as a stabilizing agent, a flame retardant, a pigment and a filler, according to the need.

(Carbon Fiber)

The form of the carbon fiber in the thermoplastic carbon fiber composite material is not particularly limited, and the carbon fiber can be a discontinuous (non-continuous) fiber or a continuous fiber. In the case of the continuous fiber, the carbon fiber may be in the form of a woven fabric, and may be in the form of a sheet in which carbon fibers are aligned in one direction, for example, so-called "UD sheet" in which strands of the continuous fiber are layered. In the case of layering those in which fibers are aligned in one direction, the layering can be performed while varying the fiber arrangement direction of each layer. For example, the layers can be alternately layered in directions perpendicular to each other. Also, layering surfaces may be arranged symmetrically in a thickness direction.

The carbon fibers may be present in the state of carbon fiber bundle in the composite material, or the states of carbon fiber bundle being mixed with a single fiber. Substantially, only the single fiber may be present in a dispersed state. In the case of using the discontinuous carbon fiber, the fibers may be formed into a sheet obtained by paper-making of such carbon fibers or may be formed into a random mat in which the fibers may be arranged so as to be dispersed and overlapped in-plane-randomly. In the discontinuous carbon fibers, it is preferred that a carbon fiber bundle in which a large number of single fibers are bundled and a single fiber or a fiber similar to the single fiber state are mixed and they are present in specific ratios. When the discontinuous carbon fibers are arranged disorderly in the plane, i.e., two-dimensionally-randomly in the composite material, moldability as a sheet-like molded article and formability in the case of using a mold become good, so that the case is preferred.

In the case of using discontinuous carbon fibers, from the viewpoint of joining strength and easiness in molding at manufacturing a molded body having a desired shape, an average fiber length thereof is preferably in the range of 3 mm or more and 100 mm or less, more preferably in the range of 5 mm or more and 50 mm or less. When the average fiber length of the carbon fibers is 3 mm or more, thermal shrinkage of the composite material after joining is small. When the average fiber length is 100 mm or less, the proportion of carbon fibers exposed to the surface of the composite material is suppressed and a contact area with a metal can be sufficiently secured, so that a sufficient joining strength can be achieved.

In the invention, particularly preferred is one wherein the thermoplastic carbon fiber composite material constituted by an isotropic random mat, in which discontinuous carbon fibers are two-dimensionally-randomly arranged, and a thermoplastic resin, and wherein a ratio of a carbon fiber bundle (A) including carbon fibers of a critical number number of single fiber or more, the critical number of single fiber being defined by the following formula (a) in the mat to a total volume of the carbon fibers in the mat is preferably 20 Vol % or more and 99 Vol % or less, more preferably 20 Vol % or more and less than 99 Vol %, further preferably 30 Vol % or more and less than 90 Vol %, and particularly preferably 35 to 80 Vol %, and an average number (N) of fibers in the carbon fiber bundle (A) satisfies the following formula (b):

$$\text{Critical number of single fiber} = 600/D \quad (a)$$

$$0.7 \times 10^4/D^2 < N < 1 \times 10^5/D^2 \quad (b)$$

wherein D is an average fiber diameter (μm) of single carbon fiber.

Such a random mat constituting the thermoplastic carbon fiber composite material can be produced by, for example, methods described in WO2012/105080 and JP-A-2013-49208. For example, after a strand including a plurality of carbon fibers is continuously slit along a fiber length direction to form a plurality of narrow strands having a width of 0.05 to 5 mm as needed, the narrow strands are continuously cut into strands having an average fiber length of 3 to 100 mm. Then, the cut chopped strands (carbon fiber bundles) are opened by blowing a gas thereto and, in that state, the opened bundles are deposited in a layer form on a breathable conveyor net or the like. Thereby, an isotropic random mat can be obtained. On this occasion, it is also possible to adopt a method of producing a two-dimensional isotropic random mat containing a thermoplastic resin by depositing a particulate or short fiber-shaped thermoplastic resin on the breathable net conveyor together with carbon fibers or by supplying a molten thermoplastic resin in a film form to a mat-shaped carbon fiber layer to impregnate the resin into the carbon fiber layer.

The "two-dimensional isotropic random mat" used herein means a homogeneous mat in which discontinuous carbon fibers are arranged in a horizontal plane in random directions and lack direction in the plane. An isotropic thermoplastic carbon fiber composite material can be obtained by melting a thermoplastic resin and homogeneously impregnating the two-dimensional isotropic random mat with the molten thermoplastic resin.

In the method, by controlling conditions for opening the carbon fiber bundle, the carbon fiber bundle can be opened such that a carbon fiber bundle (A) bundled in critical number of single fiber defined by the above formula (a) or more and a carbon fiber bundle (B1) in less than the critical number of single fiber, and/or a carbon single fiber (B2) are mixed. It is sufficient to form an isotropic random mat in which the ratio of the carbon fiber bundle (A) in the isotropic random mat to a total volume of the carbon fibers is controlled to, for example, 20 Vol % or more and less than 99 Vol %, preferably 30 Vol % or more and less than 90 Vol %, and further preferably 35 to 80 Vol %, and an average number (N) of fibers in the carbon fiber bundle (A) satisfies the above formula (b).

In the above method, it is also possible to form the isotropic random mat containing carbon fiber on a non-woven fabric by arranging the non-woven fabric composed of a thermoplastic resin on a net conveyor, and moving the non-woven fabric together with the net conveyor.

Thus, the thermoplastic carbon fiber composite material prepared using the isotropic random mat containing a specific ratio of the fiber bundle in the state that a certain number of carbon fibers are bundled has particularly good joinability to a metal member to be described hereinafter. Although the reason is not yet clarified, it is presumed to be due to thermal shrinkage difference between the thermoplastic carbon fiber composite material and the metal, joining area, and the surface state of the composite material.

For the aforementioned random mat, a sheet prepared by paper-making, which contains discontinuous carbon fibers, a UD sheet in which continuous carbon fibers are aligned in one direction, and the like, each of them is all formed into a thermoplastic carbon fiber composite material containing a thermoplastic resin as a matrix by heating and pressurizing a single layer or a layered body thereof in the state of containing the thermoplastic resin and melting the thermoplastic resin contained in the sheet or mat to impregnate the molten thermoplastic resin into carbon fibers. The thermoplastic resin in this case may be supplied when producing a sheet or mat of carbon fibers or, after the production of a sheet or mat containing carbon fibers, the sheet or mat may be impregnated with the thermoplastic resin by layering a layer including the thermoplastic resin and heating and pressurizing the layer. Any thermoplastic carbon fiber composite material is not limited to a flat plate shape, may be formed so as to have a cross-section of L-shape, T-shape, H-shape, U-shape and V-shape, and may have a curved surface.

As another method for manufacturing the thermoplastic carbon fiber composite material, there may be a method in which, using long-fiber pellets, i.e., pellets obtained by steps of adjusting a molten resin to a specific viscosity, impregnating carbon fibers of continuous fiber with the molten resin, and then cutting, the pellets are molded into a specific shape by an injection molding machine. The forms of the carbon fiber composite material may be one obtained by molding the above pellets into a specific shape by an injection molding machine or a composite material obtained by impregnating a UD sheet of continuous fibers or a sheet obtained by wet paper-making of discontinuous fibers with a molten thermoplastic resin. However, in the invention, it is particularly preferred to use a composite material obtained by impregnating the aforementioned two-dimensional isotropic random mat with a molten thermoplastic resin.

Meanwhile, the thermoplastic carbon fiber composite material to be used in the invention is not limited to a composite material in which reinforcing fiber is solely constituted by carbon fibers and includes a composite material in which 50% by weight or more, preferably 70% by weight or more of the reinforcing fiber is constituted by carbon fibers. Namely, it is possible to use a thermoplastic carbon fiber composite material which contains other reinforcing fiber such as an aramid fiber or a glass fiber instead of carbon fiber in the range of less than 50% by weight, preferably less than 30% of the reinforcing fiber contained in the composite material.

[Metal]

As the metal to be used in the invention, there may be specifically mentioned metals such as iron, stainless steel, aluminum, copper, brass, nickel and zinc, and alloy thereof. It is preferred that the metal includes at least one selected from iron and aluminum, and it is more preferred that an element constituting the metal mainly includes iron or aluminum. The term "mainly includes" used herein means that the content thereof accounts for 90% by weight or more. Particularly, iron such as SS steel (rolled steel material for general structure), SPCC steel (cold-rolled steel material) or high tensile material (high tensile steel), stainless steel such as SUS304 or 316, aluminum of #1000 to #700, and alloys thereof are preferably used. The shape of the metal member to be joined is not particularly limited and can be appropriately selected in conformity with the joint member to be obtained.

Meanwhile, the metal member may contain two kinds or more of metals and may be a member containing a metal at least on its surface. Also, one having metal plating on the surface thereof may be used. The shape is not limited to only a flat plate shape so long as a surface necessary for joining to the thermoplastic carbon fiber composite material is secured, and any optional shape can be used. For example, a metal member having a cross-section of L-shape, T-shape, H-shape, U-shape and V-shape may be used, and a cylindrical metal member may be used. Furthermore, a metal member having a curved surface may be used.

[Step (i): Processing of Metal Surface]

In the step (i), for the metal to be joined, unevenness having a depth of 0.02 to 0.6 mm, preferably a depth of 0.05 to 0.5 mm is formed on a part or all part of the surface to be a joining portion. The unevenness can be formed by subjecting a surface of the metal to laser irradiation, blasting, polishing, cutting, filing, or a chemical treatment. By forming the unevenness on the metal surface as above, a thermoplastic resin melted by heating is penetrated into a concave portion of the unevenness on the metal surface at the time of joining the thermoplastic carbon fiber composite material and the metal, and thus higher joining strength is obtained.

As the uneven shape, a grid-shaped one having an interval of 0.02 to 0.6 mm or a dent having a diameter of 0.02 to 0.6 mm as the concave portion of the uneven shape is preferred.

In the case where the unevenness is formed by laser irradiation, the laser beam spot diameter of a 20W model is focused to from 0.02 to 0.6 mm$\phi$ and thus a groove having a U-shaped or V-shaped cross-section having a depth of 0.02 to 0.6 mm can be formed in a grid-shape at a distance between laser spot centers of 0.02 to 0.6 mm intervals. In this case, the groove width is preferably from 0.05 to 0.5 mm.

In the laser treatment, it is preferred to irradiate a surface of the metal with a laser light having a wavelength of 300 nm to 1,100 nm at an intensity of 50 W/mm$^2$ or more. By adopting such irradiation conditions of the laser light, the uneven shape can be uniformly formed with suppressing a decrease in metal strength. The depth and width of the above groove is controllable by selecting the conditions of the laser treatment.

Here, as usable laser, various ones such as a solid laser, a liquid laser, a gas laser, a semiconductor laser, and a chemical laser can be applied, and examples of the solid laser include YAG (yttrium-aluminum-garnet) laser and sapphire laser and examples of the gas laser include carbon dioxide laser and helium neon laser.

As blasting, there may be mentioned a grit blasting, a sand blasting, a shot blasting, a wet blasting, and the like, and the sand blasting is preferred. In the case of forming the unevenness by blasting, a blasting material having a particle size (diameter) of 40 to 2,000 μm is used and a dent that may be regarded as a sphere having a diameter ($\phi$) of 0.02 to 0.6 mm and a depth of 0.02 to 0.6 mm can be formed. As the blasting material, dry ice or the like can be also used besides the material made of a metal or ceramic.

The unevenness to be formed on the metal surface to be a joining portion may be arranged regularly or irregularly. However, for obtaining higher joining strength, it is preferred to arrange the uneven portion so that the total area of the portion accounts for 10% or more of the surface area on the metal at the joining portion. The depth, shape, size, and the like of each uneven portion to be formed on the surface of the metal are not necessarily all the same and variously shaped unevenness may be mixed. Meanwhile, the depth of the unevenness formed herein refers to, in the case where only a concave portion such as a groove or dent is formed on a flat metal surface, a depth of the groove or dent until the deepest part of the groove or dent measured on the basis of the flat surface and, in the case where a concave portion and a convex portion are formed on the metal surface, the depth refers to a depth until the deepest part of the concave portion measured on the basis of a horizontal plane containing the most protruded part of the convex portion. In the measurement, for the metal surface on which the unevenness is formed, 10 places of a region 1 cm square are chosen at random, the depth is measured for all the uneven portions present in each region, and an average value thereof is taken as a depth of the unevenness.

<Organic Coating Layer>

The method for manufacturing a joint member of the invention may include a step (i-A) of providing an organic coating layer on the surface of the metal on which the unevenness has been formed. The step (i-A) is preferably a step of providing the organic coating layer between the surface of the metal on which the unevenness has been formed and the thermoplastic resin layer, and is preferably performed between the step (i) and the step (ii). Through the step (i-A), by a method of imparting an organic compound that strengthens joining force between the metal and the thermoplastic resin layer through application, immersion, or the like to the surface of the metal on which the unevenness has been formed and then performing a drying treatment, or by an electrochemical method, a thin layer of the organic compound (hereinafter sometimes referred to as an "organic coating layer") can formed beforehand on the surface of the metal to be joined. Thus, the surface can be subjected to joining and thereby the adhesiveness at the joining portion between the metal and the thermoplastic resin layer can be still more enhanced. As the organic coating layer, a layer containing a triazine thiol derivative is preferred.

The organic coating layer is not necessarily formed on the entire surface of the metal to be joined, and the thickness is not particularly limited so long as adhesiveness can be secured. An average thickness of the organic coating layer is preferably from 0.005 to 10 μm.

As the triazine thiol derivative suitable for the formation of the organic coating layer, there may be preferably mentioned a dehydrated silanol-containing triazine thiol derivative to which chemical bonding to a metal can be expected, and an alkoxysilane-containing triazine thiol derivative. The alkoxysilane-containing triazine thiol derivative is preferably at least one selected from the group consisting of compounds represented by the following general formulae (1), (2), and (3):

(In the above general formulae (1) and (2), $R^1$ is any one of H—, $CH_3$—, $C_2H_5$—, $CH_2$=$CHCH_2$—, $C_4H_9$—, $C_6H_5$— and $C_6H_{13}$—; $R^2$ is any one of —$CH_2CH_2$—, —$CH_2CH_2CH_2$—, —$CH_2CH_2CH_2CH_2CH_2$—, —$CH_2CH_2SCH_2CH_2$— and —$CH_2CH_2NHCH_2CH_2CH_2$—; $R^3$ is —$(CH_2CH_2)_2$CHOCONHCH$_2$CH$_2$CH$_2$— or —$(CH_2CH_2)_2$N—CH$_2$CH$_2$CH$_2$—, and in this case, N and $R^3$ form a cyclic structure; X in the formulae is any one of $CH_3$—, $C_2H_5$—, n-$C_3H_7$—, i-$C_3H_7$—, n-$C_4H_9$—, i-$C_4H_9$—, t-$C_4H_9$— and $C_6H_5$—; Y is any one of $CH_3O$—, $C_2H_5O$—, n-$C_3H_7O$—, i-$C_3H_7O$—, n-$C_4H_9O$—, i-$C_4H_9O$—, t-$C_4H_9O$— and $C_6H_5O$—, n in the formulae is an integer of 1 to 3, and M is —H or an alkali metal.)

(In the above general formula (3), $R^4$ is —S—, —O—, —NHCH$_2$C$_6$H$_4$O—, —NHC$_6$H$_4$O—, —NHC$_6$H$_3$(Cl)O—, —NHCH$_2$C$_6$H$_3$(NO$_2$)O—, —NHC$_6$H$_3$(NO$_2$)O—, —NHC$_6$H$_3$(CN)O—, —NHC$_6$H$_2$(NO$_2$)$_2$O—, —NHC$_6$H$_3$(COOCH$_3$)O—, —NHC$_{10}$H$_6$O—, —NHC$_{10}$H$_5$(NO$_2$)O—, —NHC$_{10}$H$_4$(NO$_2$)$_2$O—, —NHC$_6$H$_4$S—, —NHC$_6$H$_3$(Cl)S—, —NHCH$_2$C$_6$H$_3$(NO$_2$)S—, —NHC$_6$H$_3$(NO$_2$)S—, —NHC$_6$H$_3$(CN)S—, —NHC$_6$H$_2$(NO$_2$)$_2$S—, —NHC$_6$H$_3$(COOCH$_3$)S—, —NHC$_{10}$H$_6$S—, —NHC$_{10}$H$_5$(NO$_2$)S— and —NHC$_{10}$H$_4$(NO$_2$)$_2$S—, M' is —H or an alkali metal, Z is an alkoxy group, and j is an integer of 1 to 6).

In the above general formulae (1) to (3), the alkali metal is preferably at least one selected from the group consisting of lithium, sodium, potassium, rubidium and cesium.

The triazine thiol derivative to be used in the invention specifically includes monosodium triethoxysilylpropylaminotriazine thiol that is an alkoxysilane-containing triazine thiol derivative showing an excellent effect, and the chemical formula is represented by the following formula (4).

As a method for forming the layer containing a triazine thiol derivative, the method described in WO2009/157445 is preferably mentioned. Specifically, there may be mentioned a method of immersing a metal to be joined in a water and ethanol solution of an alkoxysilane-containing triazine thiol, subsequently pulling out the metal, subjecting it to a heat treatment, completing reaction, and drying it. Also, there can be employed a method of applying the water and ethanol solution of an alkoxysilane-containing triazine thiol on a surface of the metal by means of a roller, a spray, a brush, or the like and subsequently performing a heat treatment. The layer containing a triazine thiol derivative may contain substances other than the triazine thiol derivative in a range that the object of the invention is not impaired.

In the invention, the organic coating layer is preferably the layer containing a triazine thiol derivative as mentioned above, but may be a layer of the other organic compound having a function equivalent to the above, for example, a silane coupling agent, a compound having a polar functional group such as a hydroxyl group or a carboxyl group, or the like.

<Metal Compound Layer>

It is preferable to contain a metal compound layer such as a hydroxide, a carbonate, a phosphate or a sulfate between the layer containing a triazine thiol derivative and the metal because further enhancement in joining strength can be expected. As a method for preparing the metal compound layer, the method described in WO2009/157445 may be preferably mentioned. Specifically, there may be mentioned a method of immersing the metal in an acid such as hydrochloric acid, sulfuric acid or phosphoric acid prior to the formation of the layer containing a triazine thiol derivative on the surface of the metal to be joined.

[Step (ii): Formation of Thermoplastic Resin Layer]

In the invention, a thermoplastic resin layer having a thickness ranging from 5 μm to 5 mm, preferably from 20 μm to 4 mm, further preferably from 40 μm to 3 mm is provided between the carbon fiber composite material containing a thermoplastic resin as a matrix and the surface of the metal on which an uneven shape having a depth of 0.02 to 0.6 mm has been formed, and the joining portion is heated to melt the thermoplastic resin layer, thereby joining the metal and the thermoplastic carbon fiber composite material.
<Thermoplastic Resin Layer>

The above thermoplastic resin layer is preferably formed from at least one sheet of a layer substantially constituted by a thermoplastic resin, the layer containing a hot-melt film, a sheet, a woven fabric, a non-woven fabric or a powder. Of these, it is more preferable to form it from a layer containing the film, sheet or non-woven fabric. Here, "substantially" means that the layer may contain, for example, additives such as a stabilizing agent, a flame retardant, a pigment, a filler, a plasticizer, and a melt viscosity adjusting agent, according to the need (in a ratio of 20% by weight or less as a whole), in addition to the thermoplastic resin. The thermoplastic resin layer is used in a form of a film, a sheet, a woven fabric, a non-woven fabric or a powder, and can be arranged by thermocompression bonding on a surface of the metal or the thermoplastic carbon fiber composite material or by thinly adhering to or layering on the surface of the metal or the thermoplastic carbon fiber composite material through injection molding or melt extrusion of the molten thermoplastic resin.

With regard to the kind of a thermoplastic resin constituting the thermoplastic resin layer, the resin is preferably a resin that is compatible with the matrix resin of the thermoplastic carbon fiber composite material, and there may be preferably mentioned a resin similar to the matrix resin constituting the thermoplastic carbon fiber composite material. More preferably, the thermoplastic resin constituting the thermoplastic resin layer and the thermoplastic resin constituting the matrix resin of the thermoplastic carbon fiber composite material are the same kind of resins from the viewpoint of joining strength.

The thermoplastic resin constituting the thermoplastic resin layer includes polyamide, polycarbonate, polyoxymethylene, polyphenylene sulfide, polyphenylene ether, modified polyphenylene ether, polyethylene terephthalate, polybutylene terephthalate, polyethylene naphthalate, polyethylene, polypropylene, polystyrene, polymethyl methacrylate, AS resin, ABS resin, and the like, similarly to the matrix resin of the thermoplastic carbon fiber composite material. Particularly, from the balance between costs and physical properties, at least one selected from the group consisting of polyamide, polypropylene, polycarbonate and polyphenylene sulfide is preferred. As the polyamide constituting the thermoplastic resin layer, particularly preferred are polyamides the same as those exemplified as matrix resins of the thermoplastic carbon fiber composite material.

These thermoplastic resins may contain additives such as a stabilizing agent, a flame retardant, a pigment a filler, a plasticizer, and a melt viscosity adjusting agent, according to the need.

The thickness of the thermoplastic resin layer is 5 μm or more and 5 mm or less, preferably 20 μm or more and 4 mm or less, and more preferably 40 μm or more and 3 mm or less. When the thickness of the resin layer is 5 μm or more, sufficient strength is obtained. When the thickness of the resin layer exceeds 5 mm, moment acts on a joining surface when shear load is applied to one or both of the metal and the carbon fiber composite material, and strength may be decreased as a whole. By providing the thermoplastic resin layer in a thickness of 5 μm or more, sufficient resin can be supplied when fusing in the step (iii), and the carbon fiber can be prevented from coming into contact with the metal, so that prevention of electrolytic corrosion can be expected.

Here, with respect to the thickness of the thermoplastic resin layer, in the case where the thermoplastic resin layer is substantially constituted by a film, a sheet, a non-woven fabric, or the like, it means a thickness before melting thereof. If a plurality of layers is layered, it means a total thickness after layering.

The thermoplastic resin layer is not necessarily provided on the entire surface of the metal and the entire surface of the composite material to be joined and may be provided on a part thereof so long as the adhesiveness can be secured. The thermoplastic resin layer is arranged on the joining portion in a form of a film, a sheet, a woven fabric, a non-woven fabric and/or a powder, and heat and pressure are applied to melt the thermoplastic resin such a degree that the fibers of the thermoplastic carbon fiber composite material can be impregnated with the resin, finally joining the metal to the carbon fiber composite material.

By heating and melting the film, sheet, non-woven fabric, or the like to be the thermoplastic resin layer in a state of coming into contact with at least one of the uneven surface of the metal and the surface of the composite material, preferably the uneven surface of the metal beforehand and then cooling to solidify, a homogeneous thermoplastic resin layer can be also formed on the surface. The temperature in the step of forming the thermoplastic resin layer on the surface of the metal or the composite material to be joined is preferably in the range of (melting temperature of thermoplastic resin+15° C.) or more and (decomposition temperature thereof−30° C.) or less, more preferably in the temperature range of (melting temperature of thermoplastic resin+20° C.) or more and (decomposition temperature thereof−20° C.) or less. For example, in the case where the thermoplastic resin is PA6 (melting point: 220° C.), preferable temperature is from 235 to 300° C. Meanwhile, the "melting temperature" used herein is a melting temperature of the resin constituting the thermoplastic resin layer and is a temperature that initiates sufficient flowability when a melting point does not exist. In the case where the thermoplastic resin layer is formed by bringing the above film, sheet, non-woven fabric, or the like into contact with the uneven surface of the metal and heating and melting it, preferably used is a method of laminating and fusing the film, sheet, non-woven fabric, or the like on the metal heated to the above temperature beforehand, a method of heating the metal after laminating the thermoplastic resin layer on the metal to fuse the layer, or a similar method.

In this case, when the surface temperature of the metal is less than the above range, there is a case where the thermoplastic resin is difficult to adapt to the surface and, when the temperature exceeds the above range, the decomposition of the thermoplastic resin may proceed. Furthermore, the time for maintaining such temperature is preferably as short as possible so long as a time for essentially joining the thermoplastic carbon fiber composite material to the metal can be secured and, for example, the time is preferably from about 10 seconds to 10 minutes.

Moreover, the thermoplastic resin layer may be formed on the joining surface by directly coating at least one of the uneven surface of the metal and the surface of the composite material with the molten thermoplastic resin.

The joining surface between the thermoplastic carbon fiber composite material and the metal is not limited to a flat surface, and may be a curved surface or an uneven surface. In the invention, when a non-woven fabric made of a flexible thermoplastic resin is placed on both joining surfaces and the resin is melted to form a thermoplastic resin layer, the joining can be performed without problem even though a gap is somewhat present between the composite material and the metal to be joined.

<Non-Woven Fabric>

In the invention, the thermoplastic resin layer may be substantially formed from a non-woven fabric. In this case, it is preferable to join the metal surface and the thermoplastic carbon fiber composite material by placing a non-woven fabric made of a thermoplastic resin between the thermoplastic carbon fiber composite material and the surface of the metal member having the uneven shape and heating and melting the thermoplastic resin constituting the non-woven fabric. The non-woven fabric used here is constituted by a thermoplastic resin that melts by heating and adheres to the metal. Of the thermoplastic resins mentioned above, preferred are, for example, hot-melt polyamide (nylon), polycarbonate, polyethylene terephthalate, polybutylene terephthalate, polyethylene naphthalate, polyethylene, polypropylene, and the like. Of these, polyamide and polypropylene are more preferred from the balance between costs and physical properties. As the polyamide (sometimes abbreviated as PA), particularly preferred are PA6, PA66, copolymers and a blend including those as main components. These non-woven fabric-constituting resins may contain additives such as a stabilizing agent, a flame retardant, a pigment, a filler, and the like, according to the need.

The constituent fiber of the non-woven fabric may be a continuous and/or discontinuous fiber but a fiber that is easy to melt by heating is preferred. From this standpoint, a fiber that is not subjected to stretching nor heat treatment is appropriate. When a non-woven fabric containing the same kind of resin as the thermoplastic resin that is a matrix of the thermoplastic carbon fiber composite material is used as the non-woven fabric, the thermoplastic resin is compatible with the matrix resin of the thermoplastic carbon fiber composite material upon heating and melting as described hereinafter, and the whole resin layer becomes completely unified homogeneously, so that the case is preferable.

Non-woven fabrics produced by any method of a dry process such as an air raid method or a needle punch method and a wet process such as a paper-making method can be used as the non-woven fabric. However, use of the non-woven fabric by a spun-bond method (including a melt-blow method, but not limited to this) which includes a continuous fiber excellent in costs, productivity and hot-meltability is particularly preferred. As the non-woven fabric, one non-woven fabric only may be used or a stacked product of a plurality of non-woven fabrics may be used. In the case of the latter, different kinds of non-woven fabrics may be combined and stacked.

This non-woven fabric is preferably provided over the entire surface on which the thermoplastic carbon fiber composite material and the metal are to be joined. However, in the case where necessary joining strength (adhesiveness) can be secured, the non-woven fabric may locally be provided. Furthermore, the non-woven fabric can contain an appropriate amount of water, a plasticizer or the like for the purpose of making the non-woven fabric melt easily by heating, according to the need.

It is preferable that the non-woven fabric has a total fiber areal weight of 10 to 500 g/m$^2$ and a total bulk density of 0.01 to 0.8 g/cm$^3$. The non-woven fabric having the fiber areal weight and total bulk density falling within the above ranges has both appropriate air permeability and elasticity in the thickness direction thereof. Therefore, when the thermoplastic carbon fiber composite material and the metal member are layered in the state of allowing the non-woven fabric to intervene therebetween and pressurized under heating, the non-woven fabric is melted under almost uniform pressure. Accordingly, penetration into the surface part of the thermoplastic carbon fiber composite material and/or fine unevenness present on the metal surface becomes easy and, as a result, joining area can be secured. Thereby, it becomes possible to enhance joining strength. Furthermore, the non-woven fabric has appropriate flexibility as compared with a film, and therefore, even in the case where the joining surface is a curved surface, a follow-up property to a shape becomes good. As a result, material setting at the time of molding is easy, and it becomes possible to enhance the joining strength at a target site. Therefore, an extremely excellent join state can be achieved by using the non-woven fabric as mentioned above.

The "total fiber areal weight" and "total bulk density" used herein mean a fiber areal weight and a bulk density of the whole non-woven fabric, respectively. When the thermoplastic resin layer is constituted by one sheet of a non-woven fabric, those are the fiber areal weight and bulk density of the non-woven fabric, and in the case where a plurality of non-woven fabrics are stacked to constitute the thermoplastic resin layer, those are the sum of fiber areal weights and the sum of bulk densities of the individual non-woven fabrics stacked.

[Step (iii): Joining by Welding]

In the method for manufacturing a joint member of the invention, by heating in a state of providing the thermoplastic resin layer between the metal surface on which the unevenness has been formed and the carbon fiber composite material, the thermoplastic resin layer is melted by heating and preferably the whole is simultaneously pressurized, thereby joining the metal and the thermoplastic carbon fiber composite material.

As already mentioned, the manufacturing method of the invention includes a step (i) of forming an uneven shape having a depth of 0.02 to 0.6 mm on a surface of the metal at a joining portion; a step (ii) of providing a thermoplastic resin layer having a thickness in the range of 5 μm or more and 5 mm or less at a joining portion between the surface of the metal and a surface of the composite material; and a step (iii) of melting the thermoplastic resin layer by heating the joining portion.

In the invention, the above steps (i), (ii), and (iii) may be conducted in sequence or the steps (ii) and (iii) may be conducted as one step after the step (i). The latter is excellent in productivity since the production process is simplified. Also, a step of forming the organic coating layer may be added after the above step (i) and the steps (i), (i-A), (ii), and (iii) may be conducted in sequence.

The heating method in the above step (iii) is preferably heat transfer, radiation, and the like by an external heater. Furthermore, a method of heating the metal to be joined by electromagnetic induction, a method of heating it by ultrasonic wave or laser, and a similar method can be also adopted. The method of heating by electromagnetic induction is extremely preferable for the reason that a joining surface (A) of the metal and the thermoplastic resin layer can be directly heated.

The heating temperature is preferably a melting temperature of the thermoplastic resin constituting the thermoplastic resin layer or more and a decomposition temperature thereof or less, and more preferably (melting temperature+15° C.) or more and (decomposition temperature−30° C. or less). For example, in the case where the above thermoplastic resins are all PA6, the temperature is suitably from 235 to 300° C.

The molten thermoplastic resin layer can provide a joined body having better strength by bringing it into contact with the thermoplastic carbon fiber composite material, followed by compression-bonding.

In the invention, the thermoplastic resin layer and the thermoplastic carbon fiber composite material are compression-bonded in the above step (iii) but, after joining them, a step (iv) of pressurization and compression-bonding under heating may be further conducted according to need.

In the above steps (iii) and (iv), the pressuring conditions at the time of compression-bonding are that a pressure of preferably from 0.01 to 2 MPa, more preferably from 0.02 to 1.5 MPa, and still more preferably from 0.05 to 1 MPa, is applied to the welding surface. When the pressure is 0.01 MPa or more, good joining strength is easily obtained, the shape is easily maintained because the thermoplastic carbon fiber composite material is difficult to spring back during heating, and material strength is increased, so that the case is preferred. When the pressure is 2 MPa or less, pressurized part is difficult to crush, thereby the shape is easily maintained, and material strength is increased, so that the case is preferred.

With regard to the thermoplastic resin layer to be arranged between the metal and the thermoplastic carbon fiber composite material, the thermoplastic resin layer may be formed by adhering it to either side of the metal and the thermoplastic carbon fiber composite material beforehand. For example, there may be adopted a method of providing the thermoplastic resin layer by heating and compression-bonding on the surface of the metal having the unevenness and subsequently heating and compression-bonding the thermoplastic resin layer and a joining portion of the thermoplastic carbon fiber composite material, i.e., a method of conducting the above steps (i) to (iii) in sequence. Also, there may be used a method of heating the metal surface, a thermoplastic resin layer such as a film or a non-woven fabric, and a thermoplastic carbon fiber composite material in a layered state to join them all at once after the step (i) is conducted, i.e., a method of conducting the steps (ii) and (iii) as one step. As the other specific example in the case where the steps (ii) and (iii) are simultaneously conducted, for example, a method of directly applying a molten film of the thermoplastic resin on the metal and layering thereon the thermoplastic carbon fiber composite material may be mentioned. Furthermore, when the steps (ii) to (iv) are simultaneously or continuously conducted after the step (i) is conducted, molding time can be shortened and a joint member can be efficiently manufactured.

As previously mentioned, in the invention, an organic coating layer is preferably formed on the metal surface to be joined beforehand. In this case, the thermoplastic resin layer to be arranged between the organic coating layer and the thermoplastic carbon fiber composite material may be also adhered to either one side or both sides of the metal having the organic coating layer and the thermoplastic carbon fiber composite material beforehand to form the thermoplastic resin layer on the surface(s). In the case where the thermoplastic resin layer is adhered and formed only on either one side, it is preferred to form the layer on the metal surface side having the organic coating layer formed on the surface. The temperature in the case where the thermoplastic resin layer is adhered and arranged on the metal surface having the organic coating layer formed beforehand or on the surface of the thermoplastic carbon fiber composite material is more preferably (melting temperature of thermoplastic resin+15° C.) or more and (decomposition temperature thereof−30° C. or less). The thermoplastic resin layer is used in a form of a film, a sheet, or a non-woven fabric and may be arranged by thermocompression-bonding to a desired surface or by thinly adhering to a molten resin by injection molding, extrusion, or the like.

The temperature of the metal surface when bringing the thermally molten thermoplastic resin layer into contact with the metal having the organic coating layer is preferably higher than (melting temperature of thermoplastic resin+15° C.) and lower than (decomposition temperature thereof−30° C.) as in the case where the organic coating layer is not present. When the surface temperature of the metal is less than the above range, there is a case where the thermoplastic resin is difficult to adapt to the surface and, when the temperature exceeds the above range, the decomposition of the thermoplastic resin may proceed. Furthermore, the time for maintaining such temperature is preferably as short as possible so long as a time for essentially joining the thermoplastic carbon fiber composite material to the metal can be secured and, for example, the time is suitably from about 10 seconds to 10 minutes. With respect to the joining strength between the thermoplastic resin layer and the metal, affinity with the organic coating layer containing a triazine thiol derivative on the surface of the metal is important, and there is generally a concern that the organic coating layer is degraded by high temperature. For this reason, a treatment at high temperature for a long period of time is not preferred. As one example, the joining time at 275° C. is preferably about 10 minutes or less.

Furthermore, the joined body can be also manufactured all at once by interposing one layer or multilayer of the thermoplastic resin layer having a form such as a film, a sheet, or a non-woven fabric between the joining surface of the metal having the organic coating layer and the composite material and thermocompression-bonding the whole by heating and pressuring it at a temperature of (melting temperature of thermoplastic resin+15° C.) or more and (decomposition temperature of thermoplastic resin−30° C. or less). In the case of layering a plurality of thermoplastic resin layers, the layers including different kinds of thermoplastic resins can be combined and used. Moreover, the joining and molding may be conducted simultaneously or continuously.

According to the invention, a joined body in which the metal surface having an uneven shape formed and the thermoplastic resin layer are strongly closely adhered is obtained by conducting individual steps as mentioned above. Namely, since the molten thermoplastic resin in the thermoplastic resin layer comes into contact with the uneven portion on the metal surface by heating at the time of joining and is particularly penetrated into the concave portion and solidified, it is considered that the joining strength with the metal is increased by a so-called anchor effect. Moreover, since the thermoplastic resin at least on the surface (contact surface) of the composite material on the joining portion is also melted by the heating and melting at the time of joining, it comes into close contact with the resin of the above thermoplastic resin layer as well. By compression-bonding the whole through pressurization of the above metal and the composite material simultaneously with the heating, the metal and the composite material are thoroughly closely adhered through the molten thermoplastic resin layer. After the heating is finished, upon cooling, the thermoplastic resin layer is solidified and the whole is integrated. It is presumed that the pressurization at the time of joining contributes the improvement of the adhesion strength because the pressurization facilitates the penetration of a part of the carbon fiber in the composite material into the concave portion.

Meanwhile, the metal having an uneven shape formed on the joining portion can be used for joining it after once thermally treated. The joining strength is further enhanced by the thermal treatment in many cases. The conditions for the thermal treatment in this case are preferably a temperature of 250 to 500° C. and a time of 10 seconds to 10 minutes.

[Joint Member]

In the case of joining a thermosetting carbon fiber composite material containing a thermosetting resin as a matrix to a metal, it has been forced to use of an adhesive or the molding over a long period of time in an autoclave after inserting the metal into a prepreg. The present invention, however, uses the thermoplastic carbon fiber composite material containing a thermoplastic resin as a matrix, and therefore, a molded body having a desired shape can be produced by press molding or the like. Therefore, such molding can be conducted simultaneously with the time of joining the carbon fiber composite material to a metal, or continuously. That is, the invention includes a method for manufacturing a joint member constituted by a metal composite molded body in which a thermoplastic carbon fiber composite material and a metal are joined by conducting joining and molding at the same time in a mold. For example, the joining and molding can be simultaneously conducted by conducting the above step (iii) in a mold fitted with a cavity having a specific shape, so that it is also possible to obtain the metal composite molded body easily for a short period of time.

In the invention, at the manufacturing the joint member in which a carbon fiber composite material containing a thermoplastic resin as a matrix and a metal are joined, by forming an uneven shape on a surface of the metal and melting a thermoplastic resin layer provided between the side of the metal on which the uneven shape has been formed and the carbon fiber composite material, not only the metal and the carbon fiber composite material can be strongly joined but also a metal composite molded body can be manufactured efficiently for a short period of time by conducting the joining and molding simultaneously or continuously. Thus, in the invention, since it is possible to conduct the molding and joining in the manufacturing the joint member simultaneously for a short period of time, the manufacturing is industrially an advantageous method as compared with the case of using a conventional carbon fiber composite material containing a thermosetting resin as a matrix.

According to a suitable embodiment of the invention, in a method for manufacturing a joint member obtained by joining a carbon fiber composite material containing a thermoplastic resin as a matrix and a metal, it becomes possible to efficiently manufacturing a metal-carbon fiber composite material joined body having excellent joining strength or a molded body thereof by successively conducting a step of forming a plural pieces of a concave portion having a depth of 0.02 to 0.6 mm on a surface of the metal at a joining portion, a step of forming a thin layer of a triazine thiol derivative on the surface of the metal, a step of fusing a thermoplastic resin layer on the thin layer of the triazine thiol derivative on the surface of the metal to form a thermoplastic resin layer having a thickness in the range of 5 μm or more and 5 mm or less, a step of layering a thermoplastic carbon fiber composite material on the thermoplastic resin layer to thereby form a laminate containing the metal/the thin layer of the triazine thiol derivative/the thermoplastic resin layer/the thermoplastic carbon fiber composite material, and a step of melting the thermoplastic resin layer by heating the resulting laminate together with pressurization in a thickness direction to thereby combine the metal and the thermoplastic carbon fiber composite material into one, and further by conducting the joining and molding simultaneously by conducting the combining of the metal and the thermoplastic carbon fiber composite material through the melting of the thermoplastic resin layer in a mold for molding.

Figure 1:
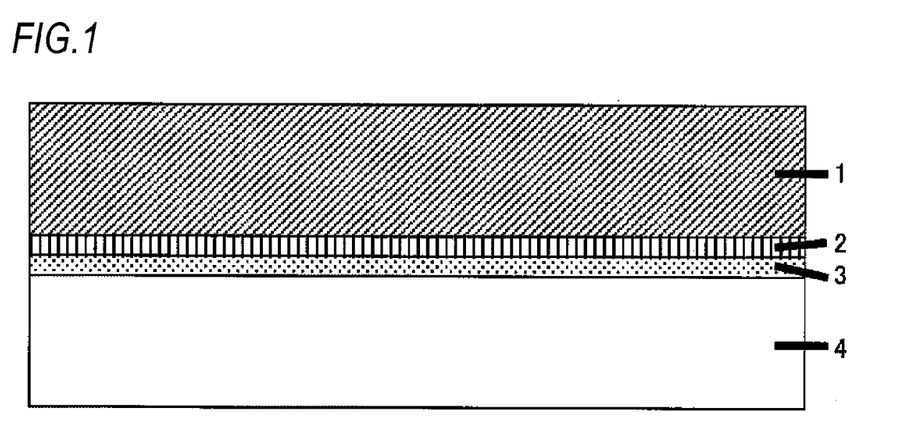
FIG. 1 is a schematic view (cross-sectional view) showing one embodiment of the joint member in the invention.

According to the invention, there is obtained the joint member in which a thermoplastic carbon fiber composite material and a metal are strongly joined. FIG. 1 shows one embodiment (cross-sectional view) of the joint member obtained by the present invention. When the joining portion is subjected to a tensile test at a tension rate of 1 mm/second, the joining strength is preferably 5 MPa or more, and a joining strength of more than 10 MPa can be achieved in the case where they are joined under particularly preferable conditions. The joining strength can be evaluated by a tensile test and the upper limit of the joining strength is substantially about 50 MPa. Therefore, the joint member of a thermoplastic carbon fiber composite material and a metal, which is obtained by the invention, is suitably used as a structural member requiring sufficient joining strength. Examples of such a structural member include parts constituting moving vehicles such automobiles, bicycles, railroad vehicles, aircrafts, and ships, and structural materials of building and furniture, materials for sporting goods, and the like.

The number of a joining site in the joint member is not limited, and can be optionally selected depending on single lap or double lap, and depending on joining environment. In the case of the double lap, the joining area becomes two times, and therefore, the joining strength also becomes two times.

EXAMPLES

The present invention is specifically described below on the basis of examples, but the invention is not limited to those.

1) Joining Strength

Five sheets of a thermoplastic carbon fiber composite material-metal member joined body (joint member) as described in each example or the like were prepared. For each sheet, a value of tensile strength was obtained by conducting a tensile test in a tension rate of 1 mm/minute by a universal tester "INSTRON (registered trademark) 5587", and an average value thereof was taken as a value of joining strength of the joined body.

2) Analysis of Fiber Bundle of Random Mat Material

The analysis of a fiber bundle of the random mat material each obtained by Reference Examples 2B and 2C was carried out according to the method described in WO2012/105080.

Moreover, the thermoplastic carbon fiber composite materials and non-woven fabrics used in Examples and Comparative Examples were produced by the methods described in the following Reference Examples.

Reference Example 1

Manufacturing of Thermoplastic Carbon Fiber Composite Material (I) of Continuous Fiber 0° and 90° Alternate Layering Material Strands of carbon fiber ("TENAX" (registered trademark) STS40-24KS (average fiber diameter: 7 μm, tensile strength:

4,000 MPa) manufactured by Toho Tenax Co., Ltd.) and nylon 6 films ("EMBLEM" (registered trademark) ON, 25 µm thick, manufactured by Unitika Ltd.) were sequentially layered to 64 layers (carbon fiber: 64 layers, nylon 6 film: 65 layers) such that layers having a fiber direction of 0° and layers having a fiber direction of 90° were arranged alternately, and the resulting laminate was compressed under heating at a temperature of 260° C. under a pressure of 2 MPa for 20 minutes. Thus, a flat-plate thermoplastic carbon fiber composite material (I) having 0° and 90° alternate fibers, symmetric ing, carbon fiber volume fraction (Vf) of 47% (content of carbon fibers on the basis of mass: 57%) and a thickness of 2 mm was prepared. The content of the thermoplastic resin in the thermoplastic carbon fiber composite material was 75 parts by weight based on 100 parts by weight of the carbon fibers.

Reference Example 2A

Manufacturing of Thermoplastic Carbon Fiber Composite Material (II-a) from Isotropic Random Mat Carbon fiber ("TENAX" (registered trademark) STS40, average fiber diameter: 7 µm, manufactured by Toho Tenax Co., Ltd.) cut into an average fiber length of 20 mm was formed into a sheet form in a randomly arranged state such that an average fiber areal weight becomes 540 g/m² and the resulting isotropic random mats were sandwiched between KE 435-POG (nylon 6) cloths manufactured by Unitika Ltd. so as to form a repeated laminate of the random mat/nylon 6 cloth. The laminate was pressed at a temperature of 260° C. under a pressure of 2.5 MPa to prepare a flat-plate thermoplastic carbon fiber composite material (II-A) having a carbon fiber volume fraction of 35% (content of carbon fibers on the basis of mass: 45%) and a thickness of 2 mm The content of the thermoplastic resin in the thermoplastic carbon fiber composite material was 120 parts by weight based on 100 parts by weight of the carbon fibers.

Reference Example 2B

Manufacturing of Thermoplastic Carbon Fiber Composite Material (II-B) from Isotropic Random Mat Strands of carbon fiber "TENAX" (registered trademark) STS40-24KS (average fiber diameter: 7 µm, tensile strength: 4,000 MPa) manufactured by Toho Tenax Co., Ltd. were used as a carbon fiber. The strands were cut into a specific length by the method described in WO2012/105080 and were deposited on a fixing net equipped with a lower suction apparatus through an opening apparatus (gas spray nozzle) and a flexible transport piping, thereby preparing two kinds of isotropic random mats having different average fiber length, degree of opening, and the like as shown in Table 1 below. Each of the random mats was sandwiched among KE 435-POG (nylon 6) cloths manufactured by Unitika Ltd. in the same manner as in Reference Example 2A. The resulting assembly was pressed at a temperature of 260° C. under a pressure of 2.5 MPa to prepare two kinds of flat-plate thermoplastic carbon fiber composite materials (II-B) having different carbon fiber volume fraction as shown in Table 1. The content of the thermoplastic resin in the thermoplastic carbon fiber composite material was 120 parts by weight based on 100 parts by weight of the carbon fibers in the specimen 1 and was 100 parts by weight based on 100 parts by weight of the carbon fibers in the specimen 2.

Reference Example 2C

Manufacturing of Thermoplastic Carbon Fiber Composite Material (II-C) from Isotropic Random Mat Strands of carbon fiber "TENAX" (registered trademark) STS40-24KS (average fiber diameter: 7 µm, strand width: 10 mm) manufactured by Toho Tenax Co., Ltd. were used as a carbon fiber. The strands were slit into a strand width of 0.8 mm using a vertical slit apparatus by the method described in JP-A-2013-49208 (Specification of Japanese Patent Application No. 2011-188768), and then cut into a fiber length of 20 mm or 25 mm using a rotary cutter having a spiral knife arranged on the surface. The strands passing through the cutter were introduced into a flexible transport piping arranged just below the rotary cutter, and subsequently introduced into an fiber opening apparatus (air spray nozzle) arranged at the lower end of the transport piping. As the fiber opening device, nipples made of SUS304 having different diameters were welded to prepare a double pipe, which was thus used. Small holes were provided on an inner pipe of the double pipe and compressed air was supplied between the inner pipe and the outer pipe thereof by a compressor. On this occasion, wind velocity from the small holes was 450 msec. A tapered pipe in which a diameter is increased toward the lower side was welded to the lower end of the double pipe such that the cut carbon fibers move to the lower side together with the air flow in the tapered pipe.

A matrix resin was supplied into the tapered pipe from the holes provided on the side surface of the pipe. As the matrix resin, particles of nylon 6 resin "A1030", manufactured by Unitika Ltd., was used. A breathable support (hereinafter referred to as a "fixing net") that moves in a certain direction was arranged at the lower side of the outlet of the tapered pipe. Suction was conducted from the lower side thereof by a blower, and while reciprocating the flexible transport piping and the tapered pipe in a width direction of the fixing net moving in a constant rate, a mixture of the cut carbon fibers and the nylon resin particles discharged together with the air flow from the tip of the tapered pipe was deposited on the fixing net in a band shape. On this occasion, the amount of the carbon fiber supplied was set to 212 g/min, the amount of the matrix resin supplied was set to 320 g/min. When the apparatus was operated, a random mat in which the carbon fibers and the thermoplastic resin were mixed without unevenness was formed on the fixing net. The fiber areal weight of carbon fiber of the random mat was 265 g/m². The nylon 6 resin particles were uniformly dispersed in the carbon fibers in the state of substantially free of unevenness.

Thus, the kinds of random mats shown in Table 2 below were prepared. Four sheets of each of the random mats were layered, placed in a mold, and press-shaped at a temperature of 300° C. under a pressure of 1.0 MPa for a heating time of 3 minutes to obtain a plate-shaped thermoplastic carbon fiber composite material (II-C) having a thickness of 2.0 mm, which is shown in Table 2. The content of the thermoplastic resin in the thermoplastic carbon fiber composite material was 120 parts by weight based on 100 parts by weight of the carbon fibers in the specimen 3 and was 100 parts by weight based on 100 parts by weight of the carbon fibers in the specimen 4. As a result of measuring tensile modulus in 0° and 90° directions of the composite material (II-C), the ratio (Eδ) of the tensile moduli was 1.03, fiber alignment was hardly observed, and a shaped plate in which isotropy was maintained was obtained. Furthermore, the shaped plate was heated at 500° C. for about 1 hour in a furnace to remove the resin, and then the ratio of the carbon fiber bundle (A) and the average number (N) of fibers were investigated. As a result, any difference from the measurement results of the above random mat was not observed.

Reference Example 3

Manufacturing of Nylon 6 Non-Woven Fabric

A Nylon 6 non-woven fabric was produced by a melt-blow method using a Nylon 6 resin "NOVAMID" (registered trademark) 1010C2 (melting temperature: 225° C.), manufactured by DMS Japan Engineering Plastics Corporation as a raw material. The melt-blow method employed here is a method for manufacturing a non-woven fabric by discharging a molten polymer from a plurality of aligned orifice dies, ejecting a high speed gas from an ejection gas port provided adjacent to the orifice dies to form the discharged molten polymer into fine fibers, and then collecting the fiber flow on a conveyor net that is a collector. The nylon 6 non-woven fabric obtained had an average fiber diameter of 5 μm, an average fiber areal weight per one non-woven fabric of 20 g/m$^2$, an average bulk density of 0.1 g/cm$^3$, and an average thickness of 0.2 mm.

Example 1

After the entire surface of one side of an SPCC plate (cold-rolled steel plate) having a length of 100 mm, a width of 25 mm and a thickness of 1.6 mm was degreased with acetone and dried, a grid-shaped groove having a laser spot center interval of 0.08 mm and a depth of 0.08 mm was formed on the entire surface of the side to be joined to a thermoplastic carbon fiber composite material using YAG laser (continuous wave) having an oscillation wavelength of 1.064 μm, a maximum rated output of 20 W, and a beam spot of 130 μm.

Two sheets of a nylon 6 film ("EMBLEM" (registered trademark) ON, 25 μm thick, melting point: 225° C., manufactured by Unitika Ltd.) were layered in piles on the metal surface thus processed. Then, the film and the SPCC plate surface were heated to 250° C. by electromagnetic induction heating, and then immediately cooled to ordinary temperature. Through this step, the nylon film was melted and closely adhered to the SPCC plate surface and then solidified to form a nylon 6 layer having a thickness of 50 μm on the SPCC surface.

The thermoplastic carbon fiber composite material (I) using continuous fiber, which was obtained in the above Reference Example 1, was cut into a length of 100 mm and a width of 25 mm and layered on the SPCC plate having the nylon layer on the surface in a range of 25 mm×25 mm by single lap. The layered body was placed in a mold and pressurized under heating at a temperature of 250° C. under a pressure of 0.2 MPa for 5 minutes in the mold to prepare a joint member of the thermoplastic carbon fiber composite material and the SPCC plate.

Five sheets of the joint member were prepared, and subjected to a tensile test at a rate of 1 mm/min by a universal tester INSTRON 5587. As a result, an average value of joining strength was 13 MPa.

Example 2

The entire surface of one side of a 590 MPa category high tensile material having a length of 100 mm, a width of 25 mm and a thickness of 1.6 mm was subjected to laser processing in the same manner as in Example 1 to form a grid-shaped groove having a depth of 0.08 mm.

Twenty sheets of a nylon 6 film ("EMBLEM" (registered trademark) ON, 25 μm thick, melting point: 225° C., manufactured by Unitika Ltd.) were layered on one surface of the above material. Then, the high tensile material was heated to 250° C. by electromagnetic induction heating, and then immediately cooled to ordinary temperature. The nylon film was melted and closely adhered, and then solidified to form a nylon 6 layer having a thickness of 500 μm on one surface of the high tensile material.

The flat plate of the thermoplastic carbon fiber composite material (II-A) constituted by a random mat, which was obtained in Reference Example 2A, was cut into a length of 100 mm and a width of 25 mm, layered on the high tensile material having the nylon 6 layer in a range of 25 mm×25 mm by single lap, the composite material was heated at 250° C., and the high tensile material was heated to 140° C., followed by pressurizing under heating under 0.2 MPa for 1 minute using a mold. Subsequently, the high tensile material in the lapped material was heated to 250° C. by electromagnetic induction heating, and pressurized under heating under 0.2 MPa for 1 minute to prepare a joint member of the thermoplastic carbon fiber composite material and the high tensile material.

Five sheets of the joint member were prepared, and subjected to a tensile test at a rate of 1 mm/min by a universal tester INSTRON 5587. As a result, an average value of joining strength was 10 MPa.

Example 3

A joint member of the thermoplastic carbon fiber composite material (I) and SPCC was prepared through the same steps as in Example 1, except that an SPCC plate having a grid-shaped groove having a depth of 0.08 mm formed on one surface by the same laser processing as in Example 1 was subjected to a heat treatment at 300° C. for 10 minutes and then a nylon 6 layer having a thickness of 0.05 mm was formed on the surface.

Five sheets of the joint member were prepared, and subjected to a tensile test at a rate of 1 mm/min by a universal tester INSTRON 5587. As a result, an average value of joining strength was 12 MPa.

Example 4

A nylon 6 layer having a thickness of 50 μm was formed on an aluminum plate surface in the same manner as in Example 1, except that #5052 aluminum plate (on which a grid-shaped groove having a depth of 0.08 mm is formed one side) having a thickness of 1 mm was used in place of the SPCC plate.

The flat plate of the thermoplastic carbon fiber composite material (II-A) constituted by a random mat, which was obtained in Reference Example 2A, was cut into a length of 100 mm and a width of 25 mm, and layered on the aluminum sheet having the nylon 6 layer in a range of 25 mm×25 mm by single lap, followed by pressurizing under heating at 250° C. under 0.2 MPa for 5 minutes using a mold, thereby preparing a joint member of the carbon fiber composite material and the #5052 aluminum sheet.

Five sheets of the joint member were prepared, and subjected to a tensile test in a rate of 1 mm/min by a universal tester INSTRON 5587. As a result, the aluminum sheet part was broken. Calculating from breaking strength of the aluminum sheet, it was realized that the joining strength was 7.1 MPa or more.

Example 5

A joint member of the thermoplastic carbon fiber composite material (I) and SPCC was prepared in the same manner as in Example 1, except that a large number of fine dents having an average aperture of 100 µm and a depth of 60 µm were formed on the entire surface of one side of SPCC (cold-rolled steel sheet) such that the total area of the dents becomes 20% relative to the metal surface area of the joining portion by sand blasting in place of the laser processing and then a heat treatment was performed at 300° C. for 10 minutes. Five sheets of the joint member were prepared, and subjected to a tensile test at a rate of 1 mm/min by a universal tester INSTRON 5587. As a result, an average value of joining strength was 12 MPa.

Example 6

Using a disk-shaped SPCC material having a thickness of 1.6 mm and a diameter of 90 mm, unevenness by laser processing was formed on one surface of the SPCC material in the same manner as in Example 1. Two sheets of a nylon 6 film ("EMBLEM" (registered trademark) ON, 25 µm thick, melting point: 225° C., manufactured by Unitika Ltd.) were placed on the side subjected to the laser processing. Then, the SPCC material was heated to 250° C. by electromagnetic induction heating, and then immediately cooled to ordinary temperature. The nylon 6 film was melted and closely adhered, and then solidified to form a nylon 6 layer having a thickness of 0.05 mm on the SPCC disk.

Figure 2:
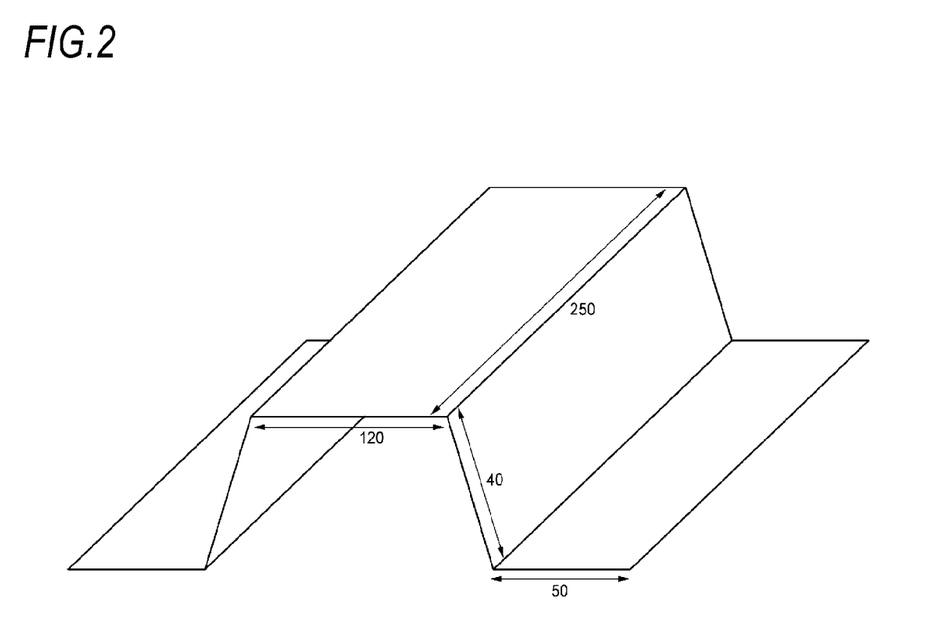
FIG. 2 is a schematic view of the hat in Example 6 of the invention.
Figure 3:
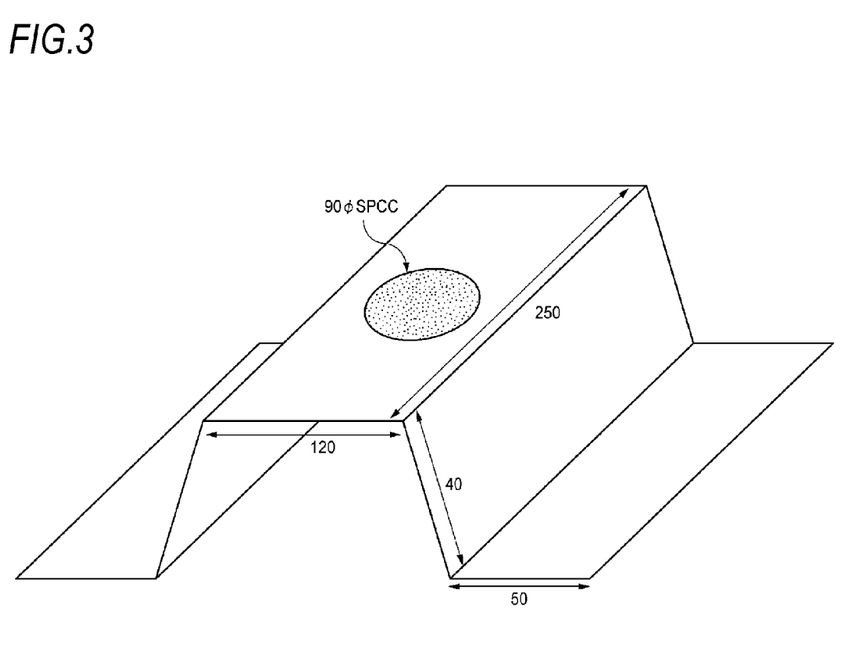
FIG. 3 is a schematic view of the disk-joined hat material obtained in Example 6 of the invention.

Then, a mold capable of molding a hat shown in FIG. 2 was heated to 140° C., a flat plate obtained by cutting the carbon fiber composite material (I) obtained in Reference Example 1 into a size of 250 mm×270 mm and the SPCC disk having the nylon 6 layer were heated to 300° C. They were charged into the mold and pressurized under heating under 0.2 MPa for 1 minute to mold a disk-joined hat material shown in FIG. 3. The disk-joined hat material was one in which the SPCC disk was strongly joined on the upper surface of a joining hat material constituted by the carbon fiber composite material.

Example 7

Both surfaces of SPCC (cold-rolled steel plate) having a length of 100 mm, a width of 25 mm and a thickness of 1.6 mm were subjected to laser processing in the same manner as in Example 1 to form a grid-shaped groove having a laser spot center interval of 0.08 mm and a depth of 0.08 mm, and further an organic coating layer was formed on the surface as follows.

In the formation of the organic coating layer, the above metal plate having the grid-shaped groove on both surfaces was degreased in an aqueous sodium hydroxide solution having a concentration of 15.0 g/L at a temperature of 60° C. for 60 seconds. The metal plate was then washed with water for 60 seconds and dried in an oven at 80° C. for 30 minutes. Thereafter, the metal plate was immersed in an aqueous phosphoric acid solution (90% or more of components other than water is phosphoric acid) having a temperature of 60° C. and a concentration of 30 to 50 g/L for 300 seconds, and then washed with hot water (60° C.) for 60 seconds and washed with water for 60 seconds to form a metal compound coating film containing a metal phosphate and a hydroxide as main components on both surfaces of the metal plate. Then, the metal plate having the metal compound coating film was immersed in an ethanol/water (volume ratio: 95/5) of monosodium triethoxysilylpropylaminotriazine thiol having a concentration of 0.7 g/L at room temperature for 30 minutes. Thereafter, the metal plate was heat-treated in an oven at 160° C. for 10 minutes. The metal plate was then immersed in an acetone solution containing N,N'-m-phenylenedimaleimide having a concentration of 1.0 g/L and dicumyl peroxide having a concentration of 2 g/L at room temperature for 10 minutes, and heat-treated in an oven at 150° C. for 10 minutes. An ethanol solution of dicumyl peroxide having a concentration of 2 g/L was sprayed to the entire surface of the metal plate at room temperature and air-dried to coat both surfaces of the metal plate with a triazine thiol derivative thin layer (thickness: 0.1 µm).

Then, two sheet each of a nylon 6 film ("EMBLEM" (registered trademark) ON, 25 µm thick, melting point: 225° C., manufactured by Unitika Ltd.) were provided on both surfaces of the SPCC plate treated as mentioned above. Thereafter, the SPCC plate was heated to 250° C. by electromagnetic induction heating, and then immediately cooled to ordinary temperature. The nylon 6 film was melted and closely adhered, and then solidified to form a nylon 6 layer having a thickness of 50 µm on the SPCC surfaces.

The thermoplastic carbon fiber composite material (II-A) obtained in Reference Example 2A was cut into a length of 100 mm and a width of 25 mm, layered on the SPCC plate having the nylon 6 layer in a range of 25 mm×25 mm by single lap, followed by pressurizing under heating at 250° C. under 0.2 MPa for 5 minutes using a mold, thereby preparing a joint member of the thermoplastic carbon fiber composite material and the SPCC plate.

Five sheets of the joint member were prepared, and subjected to a tensile test at a rate of 1 mm/min by a universal tester INSTRON 5587. As a result, an average value of joining strength was 13 MPa.

Example 8

An SPCC plate (cold-rolled steel plate) having a length of 100 mm, a width of 25 mm and a thickness of 1.6 mm, which was subjected to laser processing and surface treatment with triazine thiol derivative in the same manner as in Example 7, was prepared. After the temperature thereof was risen to 240° C., two sheets of the nylon 6 non-woven fabric by a melt-blow method obtained in Reference Example 3 were stacked on the upper surface of the SPCC. Two kinds of composite materials (II-B, specimens 1 and 2 in Table 1) using isotropic random mat materials, which were obtained in Reference Example 2B, as carbon fiber composite materials were each cut into a length of 100 mm and a width of 25 mm, and was subjected to a drying treatment at 80° C. for 5 hours. The composite materials were layered in a range of 25 mm×25 mm by single lap such that the nylon 6 non-woven fabric was arranged between the composite material and the above treated surface of the SPCC plate, and the resulting assembly was pressurized under heating under conditions of a temperature of 240° C. and a pressure of 0.5 MPa for 1 minute on a press molding machine to melt the nylon 6 non-woven fabric. Thus, a plate-like joined body formed by joining the thermoplastic carbon fiber composite material to the SPCC through a nylon 6 resin layer having a thickness of 400 µm was prepared.

Five sheets of the joined body were prepared, and a tensile test for each sheet was conducted in the same manner as in Example 7. The results were as shown in Table 1.

TABLE 1

| Target Article | Measurement Item | Specimen 1 | Specimen 2 |
|---|---|---|---|
| Random mat material | Average fiber length (mm) | 20 | 25 |
| | Critical number of single fiber | 86 | 86 |
| | Ratio of carbon fiber bundle (A) (Vol %) | 35 | 30 |
| | Average number (N) of fibers | 240 | 250 |
| Carbon fiber composite material (II-B) | Carbon fiber volume fraction (Vol %) | 35 | 40 |
| | Thickness (mm) | 2.0 | 2.0 |
| Joined body with metal plate | Average value of joining strength (MPa) | 16 | 15 |

Example 9

An SPCC plate (cold-rolled steel plate) having a length of 100 mm, a width of 25 mm and a thickness of 1.6 mm was subjected to unevenness formation and surface treatment with a triazine thiol derivative in the same manner as in Example 7, and the temperature thereof was then risen to 240° C. Two sheets of a nylon 6 film ("EMBLEM" (registered trademark) ON, 25 μm thick, manufactured by Unitika Ltd.) were placed on the upper surface of the SPCC plate.

On the other hand, each of the carbon fiber composite materials (II-C, specimen 3 and 4 in Table 2) using two kinds of isotropic random mats shown in Table 2, which were obtained by the method of Reference Example 2C, was cut into a length of 100 mm and a width of 25 mm, subjected to drying treatment at 80° C. for 5 hours, and layered with the nylon 6 film on the above treated surface of the SPCC plate in a range of 25 mm×25 mm by single lap. While maintaining the state, the resulting assembly was pressure-treated under heating at a temperature of 240° C. under a pressure of 0.5 MPa for 1 minute on a press molding machine. Thus, the nylon 6 film was melted to prepare a joined body of the thermoplastic carbon fiber composite material and SPCC.

Five sheets of the joined body were prepared, and a tensile test for each sheet was conducted in the same manner as in Example 7. As a result, the joining strength (average value of 5 sheets) of each joined body was as shown in Table 2.

TABLE 2

| Target Article | Measurement Item | Specimen 3 | Specimen 4 |
|---|---|---|---|
| Random mat material | Average fiber length (mm) | 20 | 25 |
| | Critical number of single fiber | 86 | 86 |
| | Ratio of carbon fiber bundle (A) (Vol %) | 35 | 30 |
| | Average number (N) of fibers | 240 | 250 |
| Carbon fiber composite material (II-C) | Carbon fiber volume fraction (Vol %) | 35 | 40 |
| | Thickness (mm) | 2.0 | 2.0 |
| Joined body with metal plate | Average value of joining strength (MPa) | 17 | 16 |

INDUSTRIAL APPLICABILITY

According to the present invention, a thermoplastic carbon fiber composite material and a metal can be joined strongly and stably by a simplified method. Furthermore, since the carbon fiber composite material and the metal were joined through a thermoplastic resin, electrolytic corrosion caused by carbon fiber can be simultaneously prevented. Additionally, a joint member of the carbon fiber composite material and the metal can be obtained easily for a short period of time.

Moreover, the joining and molding can be also conducted simultaneously or continuously in the same mold. Therefore, when they are simultaneously or continuously performed, it becomes possible to produce a joined body of the carbon fiber composite material and a metal (metal composite molded body) having a shape molded into a desired one in less number of steps for a short period of time.

While the invention has been described in detail and with reference to specific embodiments thereof, it will be apparent to one skilled in the art that various changes and modifications can be made therein without departing from the spirit and scope thereof.

The present application is based on Japanese Patent Application No. 2012-076865 filed on Mar. 29, 2012, and the contents are incorporated herein by reference.

DESCRIPTION OF REFERENCE NUMERALS AND SIGNS

1. Thermoplastic carbon fiber composite material
2. Thermoplastic resin layer
3. Metal surface uneven portion
4. Metal

The invention claimed is:

1. A method for manufacturing a joint member in which a carbon fiber composite material containing a thermoplastic resin as a matrix and a metal are joined, the method comprising:
   a step (i) of forming an uneven shape having a depth of 0.02 to 0.6 mm on a surface of the metal at a joining portion;
   a step (ii) of providing a thermoplastic resin layer having a thickness in the range of 5 μm or more and 5 mm or less at a joining portion between the surface of the metal and a surface of the composite material; and
   a step (iii) of melting the thermoplastic resin layer by heating the joining portion to combine the metal and the composite material into one.

2. The method for manufacturing a joint member according to claim 1,
   wherein the uneven shape formed on the surface of the metal is a grid-shaped groove having a groove interval of 0.02 to 0.6 mm.

3. The method for manufacturing a joint member according to claim 2,
   wherein the uneven shape is formed on the surface of the metal by means of laser.

4. The method for manufacturing a joint member according to claim 1,
   wherein the uneven shape formed on the surface of the metal is a dent having a diameter of 0.02 to 0.6 mm.

5. The method for manufacturing a joint member according to claim 4,
   wherein the uneven shape is formed on the surface of the metal by blasting.

6. The method for manufacturing a joint member according to claim 1, which comprises a step (i-A) of providing an organic coating layer on the surface of the metal on which the uneven shape is formed.

7. The method for manufacturing a joint member according to claim 6,
wherein the organic coating layer is a layer containing a triazine thiol derivative.

8. The method for manufacturing a joint member according to claim 1,
wherein a resin of the thermoplastic resin layer and the matrix in the carbon fiber composite material are the same kind of resin.

9. The method for manufacturing a joint member according to claim 1,
wherein the thermoplastic resin layer is formed from at least one sheet of a film, a sheet, or a non-woven fabric, which are substantially constituted by a thermoplastic resin.

10. The method for manufacturing a joint member according to claim 9,
wherein the thermoplastic resin substantially constituting the film, sheet, or non-woven fabric is the same kind of resin as the matrix in the carbon fiber composite material.

11. The method for manufacturing a joint member according to claim 1,
wherein, in the step (ii), the thermoplastic resin layer is fused onto the surface of the metal to be the joining portion and a resulting one is layered to the carbon fiber composite material such that the thermoplastic resin layer comes into contact with the surface of the carbon fiber composite material.

12. The method for manufacturing a joint member according to claim 1,
wherein the metal includes at least one selected from the group consisting of iron, aluminum, and an alloy thereof.

13. The method for manufacturing a joint member according to claim 1,
wherein the metal is a member having a flat surface or a curved surface in the joining portion.

14. The method for manufacturing a joint member according to claim 1,
wherein a content of the thermoplastic resin as the matrix in the carbon fiber composite material is from 50 to 1,000 parts by weight based on 100 parts by weight of carbon fibers.

15. The method for manufacturing a joint member according to claim 14,
wherein an average fiber length of carbon fibers in the carbon fiber composite material is from 3 to 100 mm.

16. The method for manufacturing a joint member according to claim 15,
wherein the carbon fiber composite material comprises an isotropic random mat of the carbon fibers and a thermoplastic resin,
a ratio of a carbon fiber bundle (A) including the carbon fibers of a critical number of single fiber or more in the mat, the critical number of single fiber defined by the following formula (a), to a total volume of the carbon fibers in the mat is 20 Vol% or more and less than 99Vol%, and an average number (N) of fibers in the carbon fiber bundle (A) satisfies the following formula (b):

Critical number of single fiber=$600/D$ (a)

$0.7 \times 10^4/D^2 < N < 1 \times 10^5/D^2$ (b)

wherein D is an average fiber diameter (μm) of single carbon fiber.

17. A method for manufacturing a joint member obtained by joining a carbon fiber composite material containing a thermoplastic resin as a matrix and a metal, the method comprising:
a step of forming plural pieces of an uneven portion having a depth of 0.02to 0.6 mm on a surface of the metal at a joining portion;
a step of forming an organic coating layer of a triazine thiol derivative on the surface of the metal,
a step of fusing a thermoplastic resin on the organic coating layer of the triazine thiol derivative on the surface of the metal to form a thermoplastic resin layer having a thickness in the range of 5 μm or more and 5 mm or less,
a step of layering a thermoplastic carbon fiber composite material on the thermoplastic resin layer to thereby form a laminate including the metal/ the organic coating layer of the triazine thiol derivative/ the thermoplastic resin layer/ the thermoplastic carbon fiber composite material, and
a step of melting the thermoplastic resin layer by heating the resulting laminate together with pressurization in a thickness direction to thereby combine the metal and the composite material into one.

* * * * *